(12) United States Patent
Myrah et al.

(10) Patent No.: US 8,843,667 B2
(45) Date of Patent: Sep. 23, 2014

(54) DATA STORAGE METHODS AND DATA STORAGE SYSTEMS

(75) Inventors: Michael G. Myrah, Cypress, TX (US); Martin R. Rogoff, Houston, TX (US); Balaji Natrajan, Spring, TX (US); Aaron L. Jenkins, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 141 days.

(21) Appl. No.: 13/171,995

(22) Filed: Jun. 29, 2011

(65) Prior Publication Data

US 2013/0007306 A1 Jan. 3, 2013

(51) Int. Cl.
*G06F 3/00* (2006.01)
*G06F 13/14* (2006.01)

(52) U.S. Cl.
CPC ........................ *G06F 13/14* (2013.01)
USPC ........................................................... 710/16

(58) Field of Classification Search
USPC ............................................................ 710/16
See application file for complete search history.

(56) References Cited

U.S. PATENT DOCUMENTS

| | | | |
|---|---|---|---|
| 6,965,956 B1 * | 11/2005 | Herz et al. | 710/74 |
| 7,216,195 B1 | 5/2007 | Brown et al. | |
| 7,302,512 B1 * | 11/2007 | Currid et al. | 710/268 |
| 7,644,304 B2 | 1/2010 | Kotzur et al. | |
| 7,730,252 B2 | 6/2010 | Odenwald et al. | |
| 2006/0101171 A1 * | 5/2006 | Grieff et al. | 710/36 |
| 2007/0061632 A1 * | 3/2007 | Uddenberg et al. | 714/44 |
| 2007/0162592 A1 * | 7/2007 | Marks et al. | 709/224 |
| 2008/0005470 A1 | 1/2008 | Davies | |
| 2008/0195766 A1 * | 8/2008 | Suzuki | 710/10 |
| 2009/0222733 A1 | 9/2009 | Basham et al. | |

* cited by examiner

*Primary Examiner* — Farley Abad

(57) ABSTRACT

Data storage methods and data storage systems are disclosed. An example method includes detecting a presence of a target device on a port; collecting detailed drive information associated with the target device; and preventing an initiator device from creating an affiliation with the target device until the drive information is collected.

20 Claims, 5 Drawing Sheets

DATA STORAGE METHODS AND DATA STORAGE SYSTEMS

BACKGROUND

Data storage systems include storage devices, such as serial advanced technology attachment (SATA) drives, that are accessed by initiator devices, such as servers. An initiator device as used herein refers to a device that starts a process of accessing data stored in a storage device and/or a process of storing data in a storage device. Some data storage systems include a plurality of zones, each including one or more storage devices and one or more initiator devices. In zoned data storage systems, the storage device(s) of a particular zone are accessible to the initiator device(s) of that zone and are inaccessible to initiator device(s) outside of that zone.

DETAILED DESCRIPTION

Figure 1:
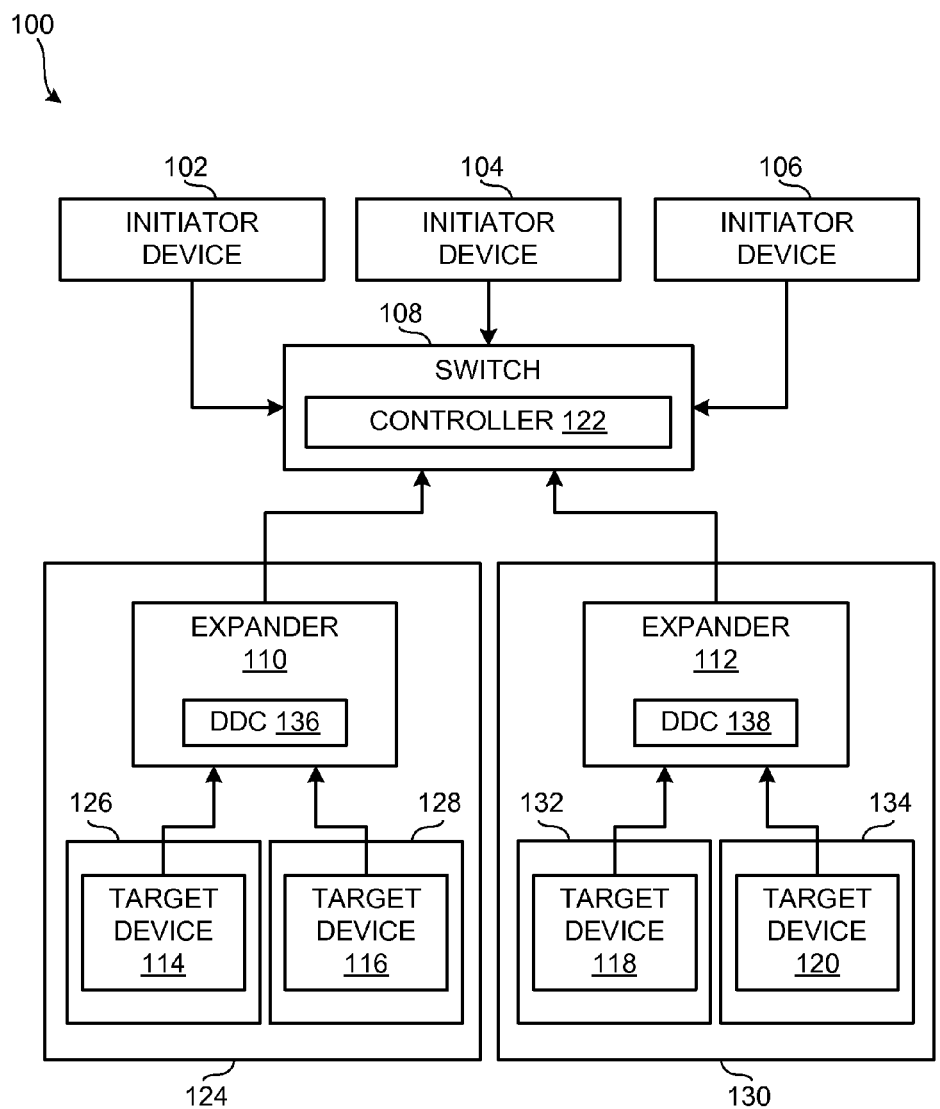
FIG. 1 illustrates an example data storage system including example drive data capturers disclosed herein and an example switch disclosed herein.

Data storage systems include components, such as storage devices and initiator devices to access the storage devices to retrieve and/or store data. These components are often housed in one or more chassis. Each chassis typically has a plurality of enclosure bays dimensioned to receive storage devices, initiator devices, switches, and/or other type(s) of components. An administrator of a data storage system typically assigns the components to the enclosure bays according to a predetermined and/or evolving design. Components of a first chassis and/or components of a second chassis are often combined to form a storage network. Additionally or alternatively, first and second storage networks can also be combined to form a larger scale storage network. Such combinations are facilitated via one or more technologies including, for example, SAN (storage area network), NAS (network-attached storage), DAS (direct-attached storage), and/or a hybrid of SAN, NAS, and/or DAS.

Management of one or more data storage networks can be a complex and involved task. Storage network management applications or programs (referred to herein as "managers") assist administrators and/or designers of storage networks in configuring, managing, and/or maintaining the same. The managers automatically track the placement of the storage devices in the assigned enclosure bays and provide a user interface to enable selection of the enclosure bay(s) such that information regarding the contents of the selected enclosure bay(s) is communicated to a user. Thus, storage network administrators and/or designers utilizing the managers are aware of certain aspects of the storage networks when, for example, designing, initializing, reconfiguring, deleting from, and/or adding to the storage networks. Different aspects of the storage networks are available to users of the managers depending on, for example, what type(s) of device(s) are included in the storage network.

In some examples, one or more segments of a storage network include one or more SATA (Serial Advanced Technology Attachment) drives that store data, one or more SAS (Serial Attached Small Computer System Interface (SCSI)) drives that store data, and/or one or more SAS switches that route data between initiator devices and the SATA and/or SAS drives. In some examples, one or more administrators and/or designers create zones in the storage network. A zoned storage network is one that groups the components thereof into two or more zones. Each zone defines which initiator device(s) or host system(s) have access to which storage device(s) of that zone. For example, a first server (an initiator device) may have access to the SATA drive(s) of a first zone but not have access to the SATA drive(s) of a second zone, while a second server may have access to the SATA drive(s) of the second zone and a third zone but not have access the SATA drive(s) of the first zone. The voluminous possible configurations make designing and maintaining such a storage network complex and, thus, manual management cumbersome. Accordingly, computer programs and/or applications (referred to herein as managers) are utilized to assist in the process of zoning the components of a storage network and/or tracking the storage of the components in the various zones.

In previous zoned storage networks including SAS and/or SATA drives housed in enclosure bays of one or more chassis, administrators using managers to identify SATA drives of an enclosure bay have been provided with an enclosure bay identifier, drive presence information, and a drive type. Example methods and apparatus disclosed herein collect and communicate information related to SATA drives of a storage network that was previously unavailable to the managers described above. In particular, example methods and apparatus disclosed herein provide useful information such as, for example, drive capacity, drive speed (e.g., rotations per minute), product identifier(s), firmware version, link rate, etc. to storage network administrators. Such information is useful when, for example, configuring and/or managing a storage network. Lack of this information has been a source of frustration and delay. As described in greater detail below, example methods and apparatus disclosed herein capture this information before the process of zoning the storage network causes the information to become unavailable to a storage network manager. Example methods and apparatus disclosed herein also store the captured information and/or communicate the same to, for example, an administrator of the storage network via a user interface implemented by a controller.

FIG. 1 illustrates an example data storage network 100 implemented in accordance with the teachings of this disclosure. The example data storage network 100 of FIG. 1 includes a plurality of initiator devices 102-106, a switch 108, first and second expanders 110 and 112, and a plurality of target devices 114-120. In the illustrated example of FIG. 1, the initiator devices 102-106 of FIG. 1 are servers that access data stored on the target devices 114-120. Although the example initiator devices 102-106 of FIG. 1 are described herein as three servers, the example storage network 100 may include any number of and/or type(s) of initiator devices. In the illustrated example of FIG. 1, a first one of the target devices 114 and a second one of the target devices 116 are SATA drives, and a third one of the target devices 118 and a fourth one of the target devices 120 are SAS drives. However, the storage network 100 may include any number and/or type(s) of target devices.

In the illustrated example of FIG. 1, the switch 108 is a SAS switch that routes communications between the initiator devices 102-106 and the expanders 110-112 (and, thus, the target devices 114-120) according to SAS switching and addressing protocols. SAS protocols define a plurality of commands and responses that are exchanged between components of a SAS storage network. The example storage network 100 of FIG. 1 may be referred to as a SAS fabric. The example expanders 110-112 of FIG. 1 are SAS expanders that expand the capabilities and capacity of the storage network 100 to include multiple storage devices. In particular, the example SAS expanders 110-112 of FIG. 1 enable more than one of the target devices 114-120 to be communicatively coupled to a single port of one or more of the initiator devices 102-106. Although an SAS switch 108 is used in the example of FIG. 1, switches operating in accordance with other past, present, and/or future protocols may additionally or alternatively be used.

The example SAS switch 108 of FIG. 1 includes a controller 122 that executes an application or program to assist a user (e.g., an administrator and/or designer associated with the storage network 100) with, for example, configuring, managing, and/or maintaining the storage network 100. In addition to other functionality, the example controller 122 of FIG. 1 interacts with the user to develop a configuration for components of the storage network 100 (e.g., the target devices 114-120) to be placed in one or more enclosure bays of one or more chassis. That is, the controller 122 of FIG. 1 assists the user in placing components in the enclosure bays of a plurality of chassis and assists the user in zoning (e.g., defining which initiators have access to which target device(s)) the components of the storage network 100. In the illustrated example, the first expander 110 is located in a first chassis 124, the first target device (e.g., SATA drive) 114 is located in a first enclosure bay 126 of the first chassis 124, and the second target device (e.g., SATA drive) 116 is located in a second enclosure bay 128 of the first chassis 124. Further, the second expander 112 is located in a second chassis 130, the third target device (e.g., first SAS drive) 118 is located in a third enclosure bay 132 of the second chassis 130, and the fourth target device (e.g., second SAS drive) 120 is located in a fourth enclosure bay 134 of the second chassis 130. Additional or alternative configurations are possible. For example, the example storage network 100 may include additional and/or chassis and the first and/or second chassis 124 and 130 may include fewer and/or additional enclosure bays. To assist the user in developing the placement configuration, the example controller 122 of FIG. 1 presents information to the user related to components located in the enclosure bay(s). In previous storage networks including zoned SAS drives and SATA drives coupled to SAS switch(es), the information available to the user concerning the SATA drives was limited to a drive type (e.g., SATA). That is, using previous systems, the user of a manager application was not presented with detailed information related to many aspects of the SATA drives located in the enclosure bays, but rather, was merely informed that the drive was a SATA drive (as opposed to a SAS drive). This problematic lack of information was caused, at least in part, by the inability of the SAS switch 108 to collect information from a zoned SATA drive 114 because SATA drives cannot accept and/or process SAS commands and because the SAS switch 108 cannot access such information associated with the SATA drive 114 when an affiliation including the SATA drive 114 exists (e.g., between the SATA drive 114 and the controller 122 or one of the initiator devices 102-106).

The example storage network 100 of FIG. 1 includes first and second drive data capturers (DDCs) 136 and 138 that provide detailed information to the user via the controller 122 (and/or any other device or application capable of communicating data related the storage network 100 to the user). This detailed information goes beyond the information that was previously available to users of such systems. In particular, the example DDCs 136 and 138 of FIG. 1 enable the example controller 122 of FIG. 1 and/or similar network management applications, programs, tools, etc. to present users with data related to the SATA drives 114 and 116 such as drive capacity, rotations per minute (RPM), product identifier(s), firmware version, and/or link rate. To enable communication of this additional information via the controller 122, the example DDCs 136 and 138 of FIG. 1 detect a presence of a SATA drive (e.g., the first and/or second SATA drives 114-116 of FIG. 1) on a port of the corresponding expander. In particular, the first and/or second expanders 110-112 collect information from the detected SATA drive(s), prevent an affiliation from being established with the detected SATA drive(s) until the information is collected, and make the information available to inquiring devices, such as the SAS switch 108, via the controller 122. Example implementations of the DDCs 136 and 138 are described in detail below. Further, although the example DDCs 136 and 138 of FIG. 1 are as implemented in connection with the example expanders 110 and 112, the example DDCs 136 and 138 can be implemented in association with additional or alternative components of a data storage network and/or one or more devices associated with the example data storage network 100.

Figure 2:
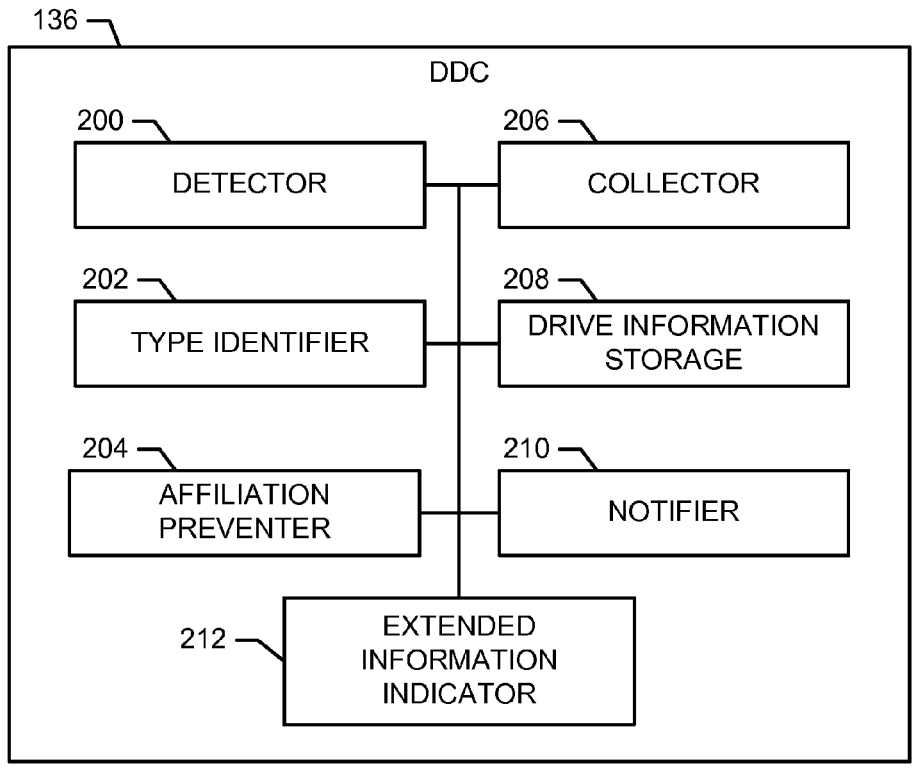
FIG. 2 is a block diagram of an example implementation of the drive data capturers of FIG. 1.

FIG. 2 illustrates an example manner of implementing the first DDC 136 of FIG. 1. Other DDCs (e.g., the second example DDC 138 of FIG. 1) may operate in a similar fashion as the example DDC 136 of FIG. 2. While the example DDC 136 can be implemented in association with additional or alternative components, the example DDC 136 of FIGS. 1 and 2 is implemented on the example SAS expander 110. The example expander 110 of FIG. 1 enables multiple target devices, such as the first and second SATA drives 114 and 116 of FIG. 1, to be communicatively coupled to a single port of one of the initiator devices 102-106. As such, the example expander 110 includes a plurality of ports (sometimes referred to as 'phys') with which a target device may be coupled. The example expander 110 of FIG. 1 routes messages (e.g., commands, acknowledgements, data, etc.) to designated components of the storage network 100 according to, for example, addresses included in the messages and/or via other mechanisms of the SAS protocol.

The example DDC 136 of FIG. 2 includes a detector 200 to detect a presence of target device(s) on port(s) of the expander 110. The presence of a target device, such as the first SATA drive 114 of FIG. 1, on a port of the expander 110 may result from an addition of a new storage device to the storage network 100 or a reconfiguration of the storage network 100 (e.g., a relocation or swap of a storage device among the enclosure bays of one or more chassis).

The example DDC 136 of FIG. 2 includes a type identifier 202 to determine a type of target device that is detected by the example detector 200. In the illustrated example, the type identifier 202 utilizes an Out-of-Band (OOB) sequence that may be part of a port (PHY) reset sequence. In particular, the example type identifier 202 of FIG. 2 analyzes replies sent from the detected target device in response to OOB inquiry messages (e.g., a COMRESET OOB signal). The replies returned by the detected target device indicate a type of the target device. For example, the type identifier 202 may interpret a received COMSAS message as the detected target device being an SAS device. On the other hand, the type identifier 202 may interpret a lack of a COMSAS message in the reply as the detected target device being a SATA device. Therefore, the example type identifier 202 can determine whether the detected target device is a SATA drive (e.g., the first or second SATA drives 114-116 of FIG. 1) or an SAS drive.

The example DDC 136 of FIG. 2 includes an affiliation preventer 204 to prevent establishment of an affiliation between the initiator device(s) 102-106 seeking to access the detected target device when the detected target device is a SATA drive (e.g., the first or second SATA drive 114 or 116 of FIG. 1). Establishment of an affiliation between, for example, a first port of the first initiator device 102 and the first target device 114 restricts the first target device 114 from communicating with other devices. To continue this example, when the first port of the first initiator device 102 and the first target device 114 become affiliated, the first target device 114 will accept data and/or messages from the first port of the initiator device 102. However, while the first target device 114 is affiliated with the first port of the initiator device 102, the first target device 114 will not accept data or messages from the second port of the second initiator device 104 or the SAS switch 108. Thus, as a result of the establishment of an affiliation involving the first target device 114 (e.g., a SATA drive), the first target device 114 does not accept commands or requests from an SAS switch (e.g., the SAS switch 108). Therefore, the SAS switch 108 cannot directly access drive information of the first target device 114 when the first target device 114 is affiliated with, for example, one of the initiator devices 102-106 or the controller 122. This set of circumstances has prohibited previous SAS switches and associated storage network management applications and/or programs from obtaining data related to zoned SATA drives beyond the presence of a drive and the drive type.

The example DDC 136 of FIG. 2 enables collection and communication of details related to zoned SATA drives via, in part, the affiliation preventer 204. In particular, the example affiliation preventer 204 of FIG. 2 prevents the establishment of an affiliation with the target SATA device detected by the example detector 200. To prevent the establishment of the affiliations, the example affiliation preventer 204 of FIG. 2 causes the expander 110 to utilize an STP bridge, which manages affiliations in the expander 110. For example, the affiliation preventer 204 (e.g., via the STP bridge) can send a message indicating that no device is attached at the port in response to a DISCOVER command, which initiates an attempt to create an affiliation, issued by an initiator device 102-106. That is, when an initiator device 102-106 inquires into the port of the expander to which the detected target device is coupled, the example affiliation preventer 204 instructs the expander 110 to indicate that no target device is present on that port. As a result the detected target device is not exposed to an SAS fabric of the storage network 100 because the target device is not affiliated with any inquiring initiator devices or the controller 122.

The example DDC 136 of FIG. 2 includes a collector 206 to collect drive information associated with the detected target device when the detected target device is a SATA drive. For example, when the detector 200 detects the presence of the first SATA device 114 of FIG. 1 communicatively coupled to a port of the first expander 112, the example collector 206 collects information from the first SATA drive 114. Example drive information collected by the collector 206 of FIG. 2 includes drive capacity, rotations per minute, product identifier(s), firmware version, and link rate. In the illustrated example, the collector 206 issues an ATA IDENTIFY DEVICE command (in accordance with the SATA protocol) to collect the drive information. The collected drive information is stored in storage 208 of the example DDC 136. In the illustrated example, the drive information storage 208 includes a cache in which the collected drive information is stored for a period of time. The period of time may be extended in response to an access of the collected drive information by, for example, the manager 122 of FIG. 1. Further, the example drive information storage 208 of FIG. 2 stores the collected drive information with mapping data that ties the detected target device (e.g., the first SATA drive 114) and the port of the expander 110 with which the detected target device is communicatively coupled to the collected drive information. The collected drive information is stored in the example drive information storage 208 in any suitable type of data structure such as, for example, an array. Further, in the illustrated example, upon the detected target device becoming unavailable (e.g., as a result of a down or failed link associated with the port of the expander 110 and/or the detected target device), the data stored in the drive information storage 208 in association with the unavailable device is cleared from the drive information storage 208.

The example DDC 136 of FIG. 2 also includes a notifier 210 to notify components of the storage network 100 (e.g., the initiator devices 102-106) that a target device was detected on the port of the expander 110 once the drive information has been collected. As described above, while the collector 206 is collecting the drive information, the affiliation preventer 204 prevents initiator devices and/or the controller 122 from discovering and affiliating with the target device. After the collector 206 has collected the drive information associated with the detected target device, the affiliation preventer 204 ceases this prevention by, for example, no longer responding to DISCOVER commands in manner that prohibits discovery of the target device (e.g., via the STP bridge of the expander 110). As a result, an initiator device that previously attempted to affiliate with the target device is no longer impeded from affiliating with the target device via a DISCOVER command. In addition to no longer preventing an affiliation of with an initiator device, the example notifier 210 sends out a BROADCAST (CHANGE) primitive in accordance with the SAS protocol that notifies the SAS fabric that a new device was detected and that affiliations may be created. Because the notifier 210 sends out the BROADCAST (CHANGE) primitive after the drive information associated with the target device has been collected and stored, the stored drive information can be communicated to, for example, the controller 122 in response to an inquiry from a user regarding the contents of the enclosure bay in which the new target device is housed even after the initiator device is affiliated with the target SATA device. Thus, a user inquiring into the SATA drive that has been exposed to the SAS fabric of the storage network 100 may be presented with detailed information related to the SATA drive such as, for example, drive capacity, drive speed (e.g., rotations per minute), product identifier(s), firmware version, and/or link rate. As a result, the user is better able to configure the storage network 100 according to one or more desires, constraints, etc.

To indicate that the expander 110 supports the capabilities provided by the example DDC 136 (e.g., extended information for SATA drives), the example DDC 136 includes an extended information indicator 212 that is inspectable by, for example, the SAS switch 108 of FIG. 1 to determine whether the expander 110 includes the drive information related to the SATA drives 114 and 116 of FIG. 1. The example extended information indicator 212 can be, for example, a status bit or marker that indicates the capabilities of the expander 110 and may correspond to a flag set by the collector 206 above. An expander that does not provide the capabilities of the DDC 136 either does not have an extended information indicator 212 or has an extended information indicator that indicates the lack of the capability provided by the example DDC 136.

While an example manner of implementing the DDCs 136 and 138 of FIG. 1 has been illustrated in FIG. 2, one or more of the elements, processes and/or devices illustrated in FIG. 2 may be combined, divided, re-arranged, omitted, eliminated and/or implemented in any other way. Further, the example detector 200, the example type identifier 202, the example affiliation preventer 204, the example collector 206, the example drive information storage 208, the example notifier 210 and/or, more generally, the example DDC 136 of FIG. 2 may be implemented by hardware, software, firmware and/or any combination of hardware, software and/or firmware. Thus, for example, any of the example detector 200, the example type identifier 202, the example affiliation preventer 204, the example collector 206, the example drive information storage 208, the example notifier 210 and/or, more generally, the example DDC 136 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus claims of this patent are read to cover a purely software and/or firmware implementation, at least one of the example detector 200, the example type identifier 202, the example affiliation preventer 204, the example collector 206, the example drive information storage 208, the example notifier 210 and/or, more generally, the example DDC 136 of FIG. 2 are hereby expressly defined to include a tangible and/or non-transitory computer readable medium such as a physical memory, DVD, CD, etc. storing the software and/or firmware. Further still, the example DDC 136 of FIG. 2 may include one or more elements, processes and/or devices in addition to, or instead of, those illustrated in FIG. 2, and/or may include more than one of any or all of the illustrated elements, processes and/or devices.

Figure 3:
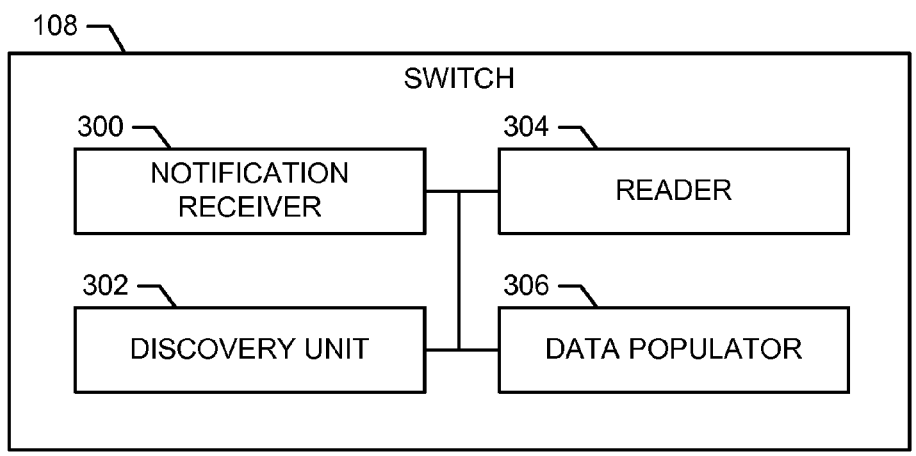
FIG. 3 is a block diagram of an example implementation of the switch of FIG. 1.

FIG. 3 is a block diagram of an example implementation of the example SAS switch 108 of FIG. 1. As described above in connection with FIG. 1, the example switch 108 of FIG. 1 includes a manager 122 that assists an administrator and/or designer of the storage network 100 with designing, configuring, and/or maintaining the storage network 100. The example controller 122 tracks and/or obtains information related to, for example, the target devices 114-120 located in the example enclosure bays 126, 128, 132 and 134 of the chassis 124 and 130 and communicates the tracked information to user(s) of the controller 122 (e.g., via a graphical user interface generated by the controller 122).

The example switch 108 includes a notification receiver 300 that receives notifications from the example notifier 210 of FIG. 2. In some examples, the notifications are BROADCAST (CHANGE) primitive messages issued in accordance with the SAS protocol. In the illustrated example of FIG. 3, the example notification receiver 300 receives the notification and informs a discovery unit 302. The example discovery unit 302 of FIG. 3 issues a DISCOVER command or a DISCOVER LIST ATTACHED DEVICE TYPE command in accordance with the SAS protocol to the target device associated with the received notification. Alternatively, the example discovery unit 302 may issue a DISCOVER command before receiving the BROADCAST (CHANGE) primitive in, for example, an attempt to discover new target devices in the network 100. In the illustrated example, the discovery unit 302 inspects a response (e.g., a DISCOVER or DISCOVER LIST response) received from the target device associated with the notification (e.g., via the expander 110 or 112) to determine whether the corresponding expander supports the extended information provided by the example DDCs 136 and 138 disclosed herein. In the illustrated example, the discovery unit 302 can inspect the extended information indicator 212 of FIG. 2 to make this determination.

When the discovery unit 302 discovers that the expander to which the target device that is the subject of the received notification at the notification receiver 300 supports the information provided by the DDCs 136 and 138, a reader 304 of the switch 108 reads drive information stored in the drive information storage 208 of the DDC 136 at the expander 110. In the illustrated example of FIG. 3, the reader 304 sends a command in accordance with the SAS protocol to the expander 110 to read drive information from the drive information storage 208. The command can be a vendor specific command or a READ BUFFER command. The detailed drive information read from the drive information storage 208 may also include mapping information associated with the port of the expander 110 to which the subject target device is communicatively coupled and/or port information of the target device.

The example switch 108 of FIG. 3 also includes a data populator 306 to populate one or more data structures with the detailed drive information read by the reader 304. In the illustrated example, the data populator 306 conveys information to the controller 122, which implements a graphical user interface having a first segment for configuring placement of the components of the storage network 100 in the enclosure bays of one or more chassis and a second segment for zoning the components of the storage network 100 together to define an access scheme. As a result of the information provided by the DDC 136 of FIG. 2, the information presented to user(s) of the controller 122 includes detailed data of SATA drives that was previously unavailable for SATA drives. For example, when using the controller 122, a user may select an icon corresponding to the first enclosure bay 126 that houses the first SATA drive 114. In response to such a selection, the user is presented with a drive capacity, a drive speed (e.g., rotations per minute), product identifier(s), a firmware version, and/or a link rate associated with the SATA drive 114. Using this detailed drive information, the user of the controller 122 can plan and implement the placement of the components of the storage network 100 and/or the zoning of the components with a greater understanding of the capabilities of the drives of the storage network 100.

While an example manner of implementing the switch 108 of FIG. 1 has been illustrated in FIG. 3, one or more of the elements, processes and/or devices illustrated in FIG. 3 may be combined, divided, re-arranged, omitted, eliminated and/or implemented in any other way. Further, the example notification receiver 300, the example discovery unit 302, the example reader 304, the example data populator 306, and/or, more generally, the example switch 108 of FIG. 3 may be implemented by hardware, software, firmware and/or any combination of hardware, software and/or firmware. Thus, for example, any of the example notification receiver 300, the example discovery unit 302, the example reader 304, the example data populator 306, and/or, more generally, the example switch 108 of FIG. 3 could be implemented by one or more circuit(s), programmable processor(s), application specific integrated circuit(s) (ASIC(s)), programmable logic device(s) (PLD(s)) and/or field programmable logic device(s)

(FPLD(s)), etc. When any of the apparatus claims of this patent are read to cover a purely software and/or firmware implementation, at least one of the example notification receiver 300, the example discovery unit 302, the example reader 304, the example data populator 306, and/or, more generally, the example switch 108 of FIG. 3 are hereby expressly defined to include a tangible and/or non-transitory computer readable medium such as a physical memory, DVD, CD, etc. storing the software and/or firmware. Further still, the example switch 108 of FIG. 3 may include one or more elements, processes and/or devices in addition to, or instead of, those illustrated in FIG. 3, and/or may include more than one of any or all of the illustrated elements, processes and devices.

Figure 4:
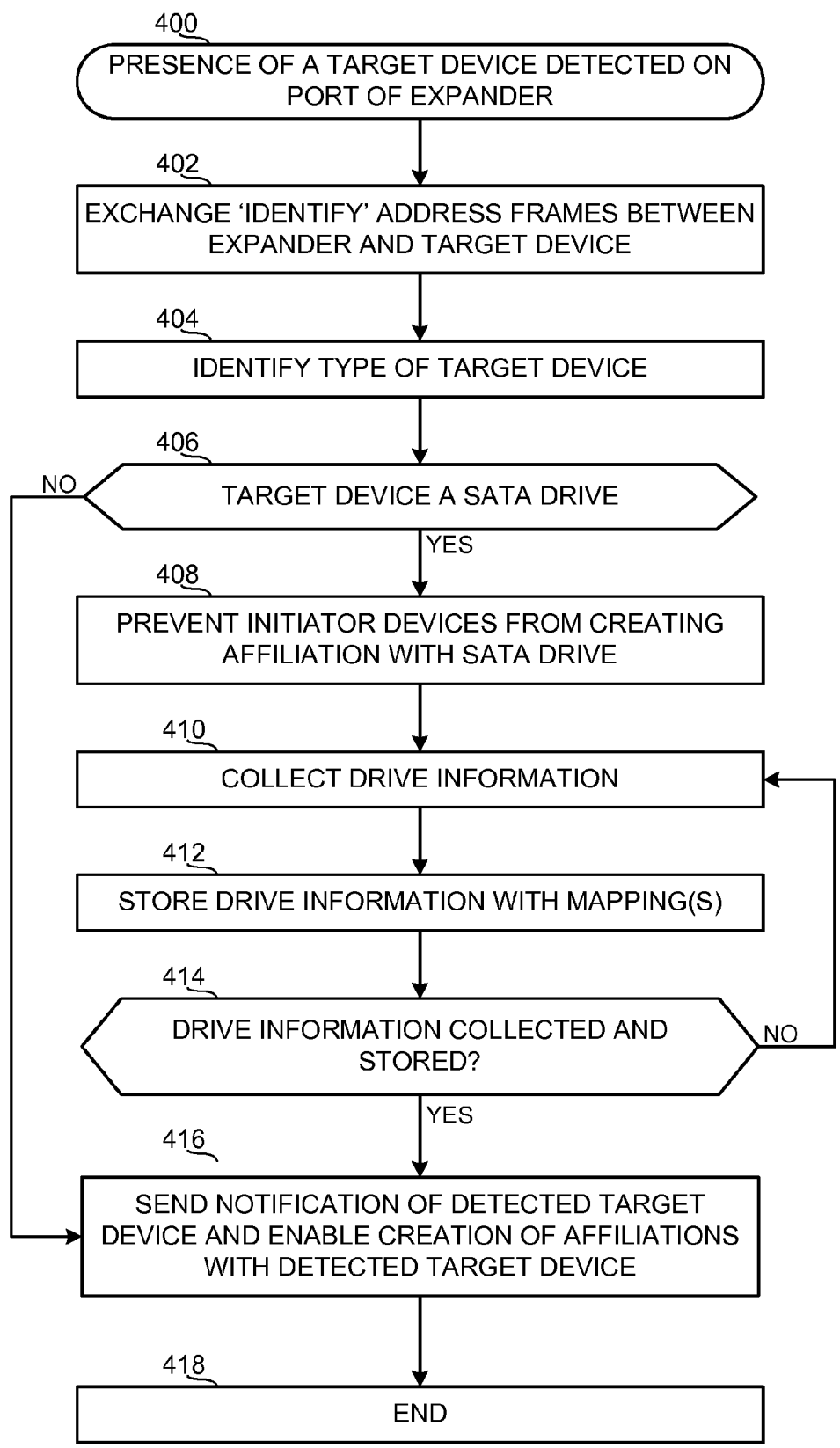
FIG. 4 is a flowchart illustrating example machine readable instructions that may be executed to implement the example drive data capturers of FIGS. 1 and/or 2.
Figure 5:
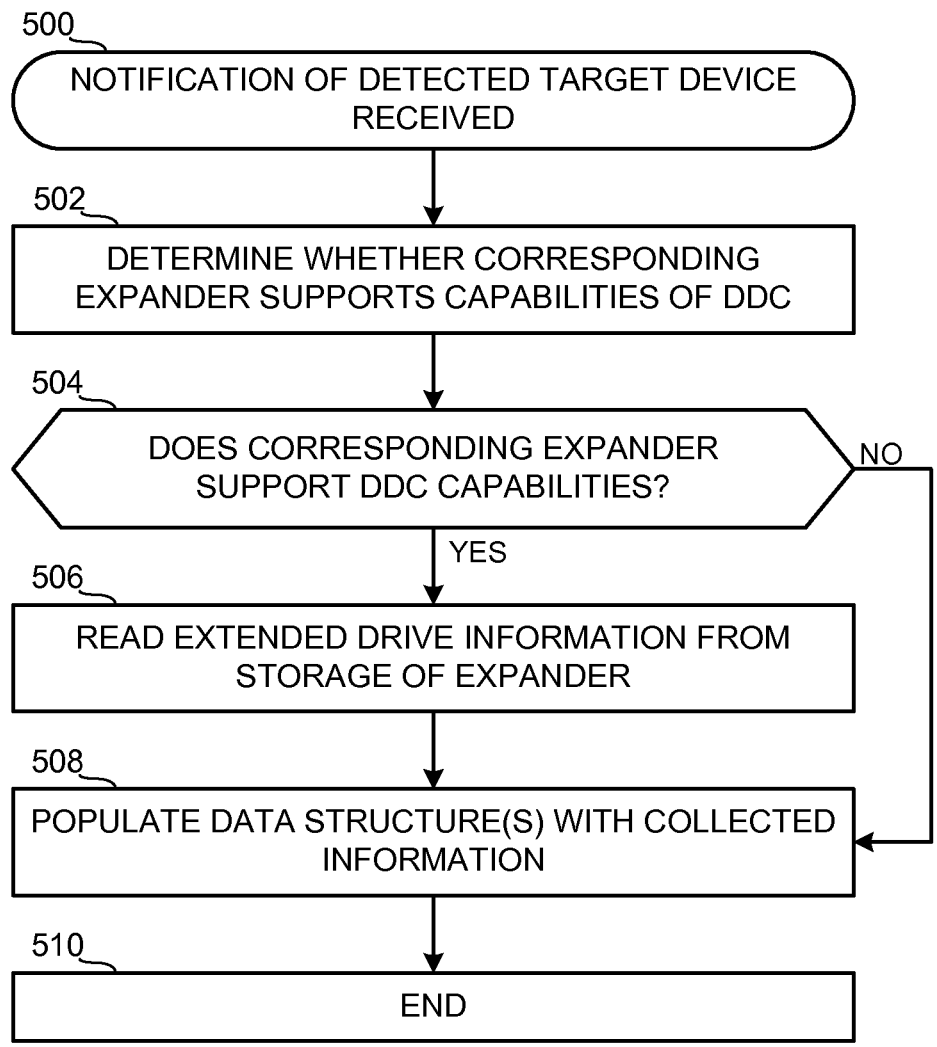
FIG. 5 is a flowchart illustrating example machine readable instructions that may be executed to implement the example switch of FIGS. 1 and/or 2.

FIG. 4 is a flowchart representative of example machine readable instructions which may be executed to implement the example DDC 136 of FIGS. 1 and/or 2. FIG. 5 is a flowchart representative of example machine readable instructions which may be executed to implement the example switch 108 of FIGS. 1 and/or 3. In these examples, the machine readable instructions comprise programs and/or routines for execution by a processor such as the processor 612 shown in the example processor platform 610 discussed below in connection with FIG. 6. The programs may be embodied in software stored on a computer readable medium such as a CD-ROM, a floppy disk, a hard drive, a digital versatile disk (DVD), and/or any form of physical memory associated with the processor 612, but the entire program and/or parts thereof could alternatively be executed by a device other than the processor 612 and/or embodied in firmware or dedicated hardware. Further, although the example programs are described with reference to the flowcharts illustrated in FIGS. 4 and 5, many other methods of implementing the example DDC 136 and/or switch 108 may alternatively be used. For example, the order of execution of the blocks may be changed, and/or some of the blocks described may be changed, eliminated, or combined.

As mentioned above, the example processes of FIGS. 4 and/or 5 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4 and/or 5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

The example of FIG. 4 begins when the detector 200 of the example DDC 136 detects a presence of a target device on a port of the expander 110 (block 400). The presence of the target device on the port of the expander 110 indicates to the example DDC 136 that a new or reconfigured target device has been added to or relocated in the example storage network 100. For example, the detected target device may be a SATA drive that was placed in an empty enclosure bay of the first chassis 124 or may have been relocated or reconfigured to be communicatively coupled to the port of the expander 110 on which the target device was detected. In accordance with the SAS protocol implemented by the example storage network 100 of FIG. 1, the detected target device and the expander 110 exchange OOB signals to identify what type of device has been communicatively coupled to the expander 110 (block 404). In the illustrated example, the type identifier 202 determines whether the detected target device is a SAS device or a SATA device by analyzing the OOB signals. When the detected target device is a SATA drive (block 406), the example affiliation preventer 204 begins preventing devices (e.g., initiator devices 102-106 and/or the controller 122) from establishing an affiliation with the SATA drive (block 408). As a result, any of the initiator devices 102-106 sending out DISCOVER commands to the detected target device results in the initiator devices receiving an indication that no target device is communicatively coupled to the port of the expander 110 into which the initiator device inquired.

The example collector 206 then collects the detailed drive information associated with the SATA drive (block 410). In the illustrated example, the collector 206 collects detailed drive information such as a drive capacity, a drive speed (e.g., rotations per minute), product identifier(s), a firmware version, and/or a link rate associated with the detected SATA drive. The collected detailed drive information is stored in the drive information storage 208 along with one or more mappings tying the detected SATA drive to the port of the expander 110 to which the SATA drive is communicatively coupled (block 412). After the detailed drive information associated with the detected SATA drive is collected (block 414), the notifier 210 notifies the initiator devices 102-106 and the switch 108 of the detected SATA drive, which enables, for example, the initiator devices 102-106 and/or the controller 122 to create an affiliation with the detected target device (block 416). Control then passes to block 418 where the example flowchart of FIG. 4 ends.

The example of FIG. 5 begins with receipt of a notification of a detected target device at the switch 108 (block 500). The notification in the illustrated example is a primitive message issued by the notifier 210 of FIG. 2. In response, the example discovery unit 302 of the switch 108 determines whether the expander corresponding to the detected target device supports the capabilities (e.g., the extended information related to SATA drives installed into the storage network 100) provided by the example DDCs 136 and 138 (block 502). If the expander does support the capabilities provided by the DDCs 136 and 138 (block 504), the example reader 304 of the switch 108 reads the drive information stored on the drive information storage 208 (block 506). The example data populator 306 then populates data structure(s) associated with the manager 122 with extended or detailed information related to the detected target device not previously available to managers such as, for example, drive capacity, drive speed (e.g., rotations per minute), product identifier(s), firmware version, and/or link rate (block 508). If the expander does not support the capabilities provided by the DDCs 136 and 138 (as determined at block 502), the data populated by the data populator 306 does not include detailed drive information related to the detected SATA drive such as, for example, drive capacity, drive speed (e.g., rotations per minute), product identifier(s), firmware version, and/or link rate (block 508). Instead, the data collected is limited to non-DDC data. Control then passes to block 510 and the example of FIG. 5 ends.

Figure 6:
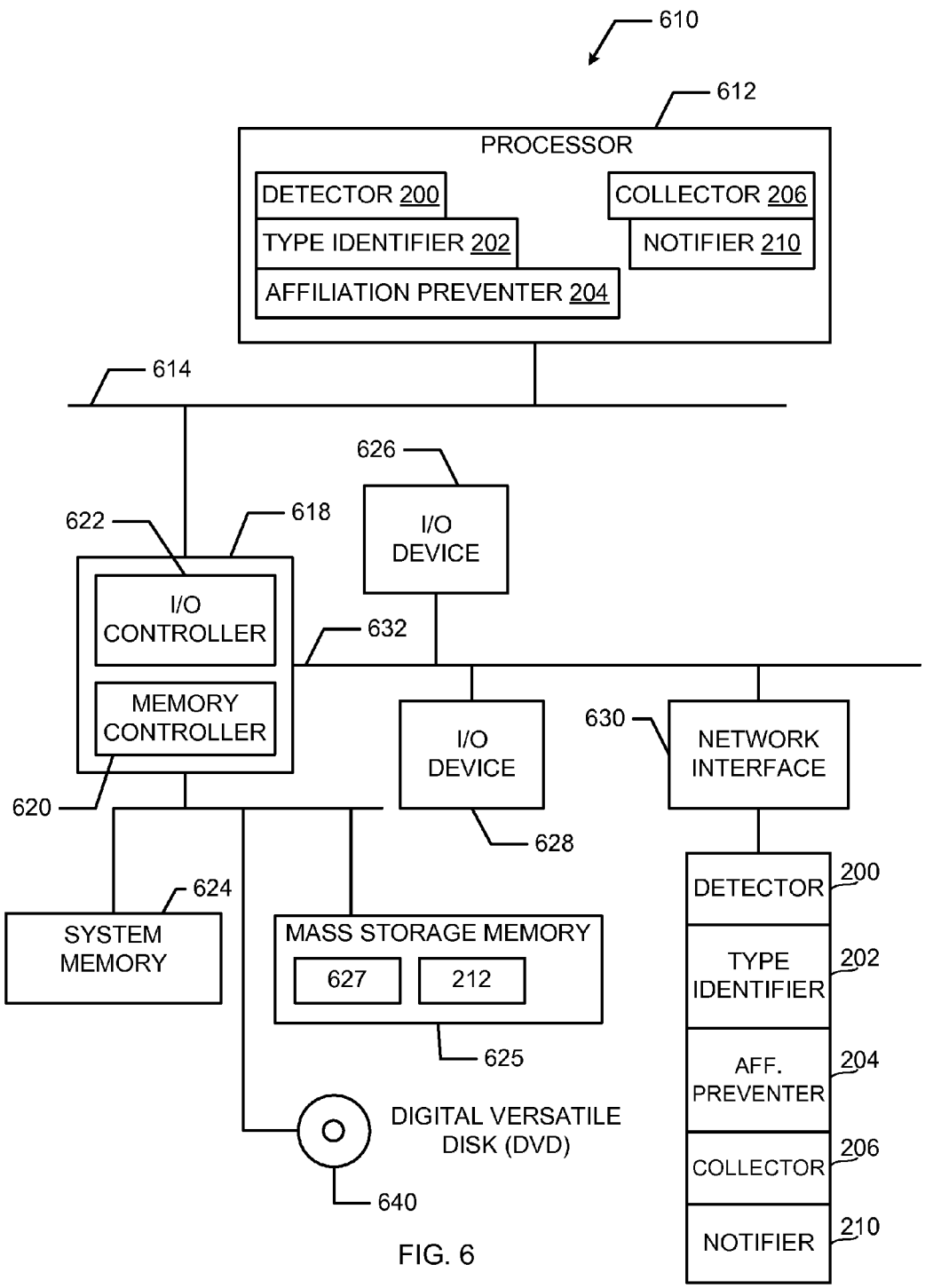
FIG. 6 is a block diagram of an example processor system capable of executing the example machine readable instructions of FIGS. 4 and/or 5 to implement the example drive data capturers of FIGS. 1 and/or 2 and/or the example switch of FIGS. 1 and/or 3.

FIG. 6 is a block diagram of an example processor platform 610 that may be used to execute the machine readable instructions of FIG. 4 to implement the example DDC 136 of FIGS. 1 and/or 2. A similar processor system can be used to execute the machine readable instructions of FIG. 5 to implement the example switch 108 of FIGS. 1 and/or 3.

The example processor platform 610 of FIG. 6 includes a processor 612 that is coupled to an interconnection bus 614. The processor 612 may be any suitable processor, processing unit, or microprocessor. The system 610 may be a multi-processor system and, thus, may include one or more additional processors that are identical or similar to the processor 612 and that are communicatively coupled to the interconnection bus 614. The processor 612 may execute the instructions of FIG. 4 to implement the example detector 200, the example type identifier 202, the example affiliation preventer 204, the example collector 206, the example drive information storage 208, the example notifier 210, and/or the example extended information indicator 212 of FIG. 2 and/or the example DDC 136 and/or 138 of FIGS. 1 and/or 2. The processor 612 may execute the instructions of FIG. 5 to implement the example notification receiver 300, the example discovery unit 302, the example reader 204, the example data populator 306, and/or the example switch of FIGS. 1 and/or 3.

The processor 612 of FIG. 6 is coupled to a chipset 618, which includes a memory controller 620 and an input/output (I/O) controller 622. A chipset provides I/O and memory management functions as well as a plurality of general purpose and/or special purpose registers, timers, etc. that are accessible or used by one or more processors coupled to the chipset 618. The memory controller 620 performs functions that enable the processor 612 to access a system memory 624, a mass storage memory 625, and/or a digital versatile disk (DVD) 640.

In general, the system memory 624 may include any desired type of volatile and/or non-volatile memory such as, for example, static random access memory (SRAM), dynamic random access memory (DRAM), flash memory, read-only memory (ROM), etc. In the illustrated example, the mass storage memory 625 includes a cache 627 that includes the drive information storage 208 of the example DDC 136 of FIGS. 1 and/or 2. In the illustrated example, the mass storage memory 625 also includes the extended information indicator 212. As described above, the DDC 136 collects detailed drive information related to SATA drives and stores the detailed drive information in the drive information storage 208. In the example of FIG. 6, the detailed drive information is cached in the mass storage memory 625 so that the information is available at speeds provided by a cache. The mass storage memory 625 may include any desired type of mass storage device including hard disk drives, optical drives, tape storage devices, etc. The machine readable instructions of FIGS. 4 and/or 5 may be stored in the system memory 624, the mass storage memory 625, and/or the DVD 640.

The I/O controller 622 performs functions that enable the processor 612 to communicate with peripheral input/output (I/O) devices 626 and 628 and a network interface 630 via an I/O bus 632. The I/O devices 626 and 628 may be any desired type of I/O device such as, for example, a keyboard, a video display or monitor, a mouse, etc. The network interface 630 may be, for example, an Ethernet device, an asynchronous transfer mode (ATM) device, an 802.11 device, a digital subscriber line (DSL) modem, a cable modem, a cellular modem, etc. that enables the processor system 610 to communicate with another processor system.

In the illustrated example of FIG. 6, the example detector 200, the example type identifier 202, the example affiliation preventer 204, the example collector 206, and the example notifier 210 of the example DDC 136 of FIG. 2 are implemented in association with the processor 612. As described above, the detector 200, the type identifier 202, the affiliation preventer 204, the collector 206, and the notifier 210 communicate message, commands, response, etc. over the storage network 100. In the illustrated example, the network interface 630 of FIG. 6 may facilitate the communication(s). The detector 200, the type identifier 202, the affiliation preventer 204, the collector 206, and the notifier 210 are also able to communicate with the memory controller 620 via the bus 614 to convey information to the cache 627 and the drive information storage 208.

While the memory controller 620 and the I/O controller 622 are depicted in FIG. 6 as separate functional blocks within the chipset 618, the functions performed by these blocks may be integrated within a single semiconductor circuit or may be implemented using two or more separate integrated circuits.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A data storage method, comprising:
  detecting a presence of a target device on a port;
  collecting drive information associated with the target device;
  determining whether a protocol of the target device is different than a protocol of a switch through which an initiator device is to communicate with the target device;
  in response to determining the protocol of the target device is different than the protocol of the switch, preventing the initiator device from creating an affiliation with the target device until the drive information is fully collected by responding to a discovery command received before the drive information is fully collected with an indication that no device is coupled to the port; and
  after the drive information is fully collected, ceasing the preventing of the affiliation.

2. A method as defined in claim 1, wherein ceasing the preventing of the affiliation comprises notifying the initiator device that the target device was detected.

3. A method as defined in claim 1, wherein ceasing the preventing of the affiliation comprises sending a broadcast primitive to enable the initiator device to create the affiliation with the target device.

4. A method as defined in claim 1, wherein the drive information includes at least one of drive capacity, drive speed, product identifier, firmware version, or link rate.

5. A method as defined in claim 1, wherein determining the protocol of the target device is different than the protocol of the switch comprises determining the target device is a SATA (Serial Advanced Technology Attachment) drive and the switch is a SAS (Serial Attached Small Computer System Interface (SCSI)) device.

6. A method as defined in claim 1, further comprising identifying the protocol of the target device by analyzing a message received during an Out-of-Band sequence between an expander and the target device.

7. A data storage method as defined in claim 1, further comprising when the protocol of the target device is identical to the protocol of the switch, responding to the discovery command with an indication that the target device is present on the port.

8. A data storage system, comprising:
a switch to facilitate zoning of a drive device, the switch to provide a communication path between an initiator device and the drive device; and
a data capturer to:
   detect a presence of the drive device on a port;
   collect drive information associated with the drive device;
   determine whether a protocol of the drive device is different than a protocol of the switch;
   in response to determining the protocol of the drive device is different than the protocol of the switch, prevent the initiator device from creating an affiliation with the drive device until after the drive information is collected by responding to a discovery command received before the drive information is fully collected with an indication that no device is coupled to the port; and
   after the drive information is fully collected, allow the initiator device to create the affiliation with the drive device.

9. A data storage system as defined in claim 8, wherein the data capturer is to allow the initiator device to create the affiliation with the drive device by, after the drive information is collected, notifying the initiator device that the drive device was detected.

10. A data storage system as defined in claim 9, wherein the data capturer is to notify the initiator device that the drive device was detected by sending a message to prompt the initiator device to create the affiliation with the drive device.

11. A data storage system as defined in claim 8, wherein the data capturer is to prevent the initiator device from creating the affiliation with the drive device when the drive device is a first type of drive different from a second type of drive.

12. A data storage system as defined in claim 8, wherein determining the protocol of the drive device is different than the protocol of the switch comprises determining the drive device is a SATA (Serial Advanced Technology Attachment) drive and the switch is a SAS (Serial Attached Small Computer System Interface (SCSI)) device.

13. A data storage system as defined in claim 8, wherein the drive information includes at least one of drive capacity, drive speed, product identifier, firmware version, or link rate.

14. An expander, comprising:
a detector to detect a presence of a target device on a port;
an identifier to identify a type of the target device;
a collector to collect drive capability information associated with the target device;
a preventer to:
   when the target device is a first type of target device different than a second type of a switch that is to facilitate communication between an initiator device and the target device, prevent the initiator device from creating an affiliation with the target device until the drive capability information is collected by responding to a discovery command received before the drive capability information is fully collected with an indication that no device is coupled to the port; and
   after the drive capability information is fully collected, cease preventing the affiliation; and
memory to store the drive capability information and to provide access to the stored drive capability information to a manager of a data storage system via the expander.

15. An expander as defined in claim 14, further comprising a notifier to, after the drive capability information is collected, issue a message to notify the initiator device that the target device was detected.

16. An expander as defined in claim 15, wherein the message prompts the initiator device to create the affiliation with the target device.

17. An expander as defined in claim 14, wherein the preventer does not prevent the initiator device from creating the affiliation with the target device when the target device is of the second type of the switch.

18. An expander as defined in claim 17, wherein the first type of target device is a SATA (Serial Advanced Technology Attachment) drive and the switch is a SAS (Serial Attached Small Computer System Interface (SCSI)) device.

19. An expander as defined in claim 14, wherein the identifier is to identify the type of the target device by analyzing a message received during an Out-of-Band sequence between the expander and the target device.

20. An expander as defined in claim 14, wherein the drive capability information includes at least one of drive capacity, drive speed or link rate.

* * * * *